March 3, 1931.   W. C. WHITE   1,795,155
FLEXIBLE PIPE JOINT
Filed July 14, 1925   2 Sheets-Sheet 1

Inventor
W. C. White

By
Lacy & Lacy, Attorneys

March 3, 1931. W. C. WHITE 1,795,155
FLEXIBLE PIPE JOINT
Filed July 14, 1925 2 Sheets-Sheet 2
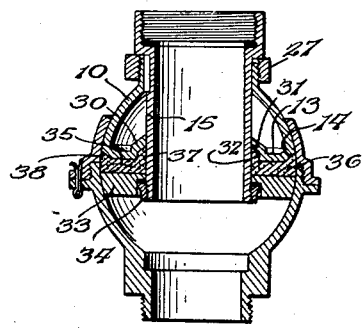
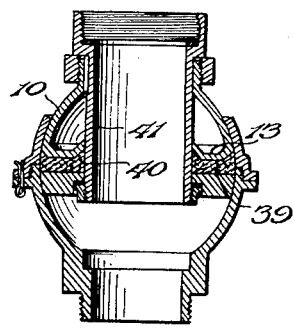
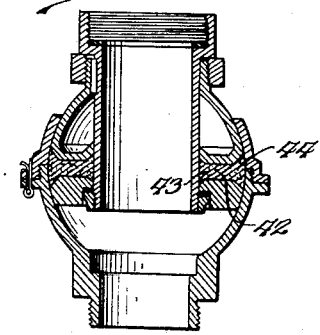
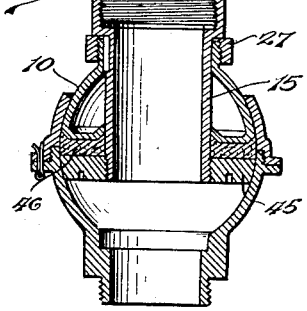
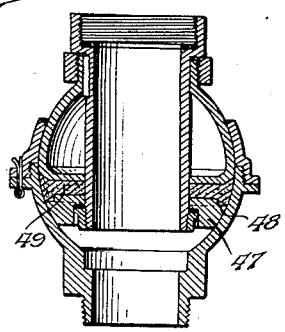
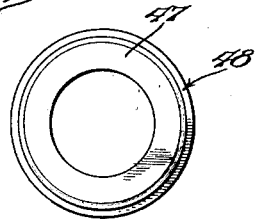
Inventor
W. C. White
By Lacy & Lacy, Attorneys Patented Mar. 3, 1931

1,795,155

UNITED STATES PATENT OFFICE

WALTER C. WHITE, OF PITTSBURGH, PENNSYLVANIA, ASSIGNOR TO INTERNATIONAL COUPLERS CO., OF PITTSBURGH, PENNSYLVANIA, A COMMON-LAW TRUST

FLEXIBLE PIPE JOINT

Application filed July 14, 1925. Serial No. 43,482.

This invention relates to an improved flexible pipe joint and seeks, among other objects, to provide a ball and socket joint which, with minimum friction between the relatively movable members of the joint, will be sealed against leakage of either liquids or fluids.

The invention seeks, as a further object, to provide a joint having means externally of the joint socket which may be adjusted for expanding the gasket of the joint against the wall of the socket for taking up wear on the gasket and closing any abrasions in the peripheral surface thereof to overcome possible leakage.

Another object is to provide a joint having the stem thereof movable axially relative to the ball so that the stem may be shifted for expanding the gasket.

A further object is to provide a joint embodying a fluid-actuated follower for feeding the gasket to the wall of the socket, and wherein means will be provided internally of the joint and adjustable to coact with the follower for initially compressing the gasket.

Still another object is to provide a joint wherein the gasket will be disposed at one side of the equatorial plane of the ball for reducing the frictional drag of the gasket against the socket wall, whereby the joint may be easily flexed.

And the invention seeks, as a still further object, to provide a joint capable of prolonged leak-proof service and which will be especially applicable for use in pipe lines or conduits as employed in the loading, unloading or transferring of gasoline.

Further objects of the invention, not above specifically mentioned, will appear as the description proceeds.

In the accompanying drawings:

Figures 5, 6, 7, 8 and 9 are vertical sectional views showing additional modified structures.

Figure 10 is a plan view of the follower shown in Figure 9.

Figure 1:
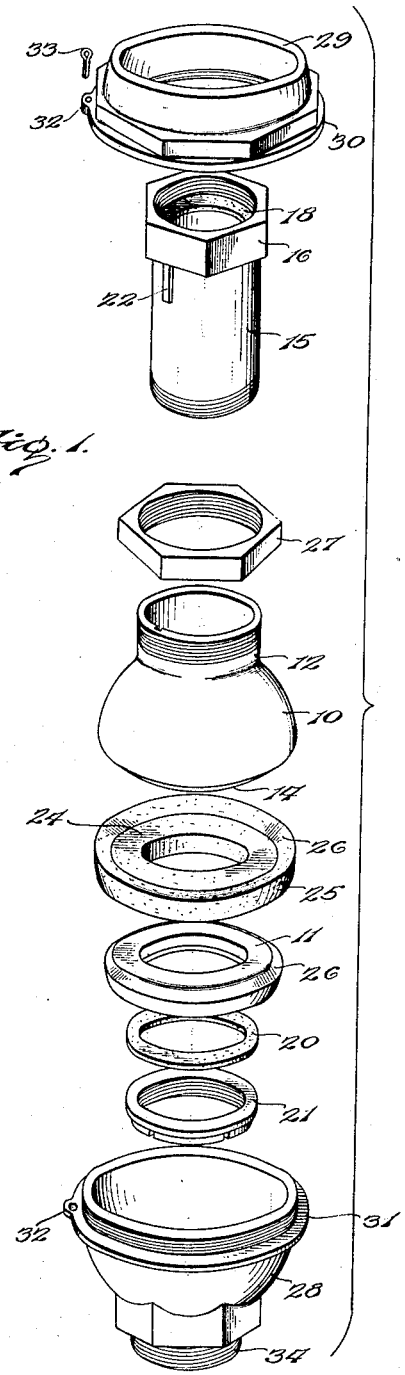
Figure 1 is a perspective view showing the parts of my improved pipe joint disassembled but in proper relative position.

As previously intimated, the joint is of the ball and socket type. The ball is of sectional construction and includes a hollow body section 10 and a complemental cap section 11 conforming at its periphery to the spherical contour of the body section. At its outer end, the body section is formed with a nipple 12 while at its inner end said section is provided with an end wall 13 having a flat outer face lying at a right angle to the axis of the nipple, and surrounding the flat face of said wall is a beveled face 14 at the periphery of the section.

Slidable through the nipple 12 of the section 10 and through the end wall 13 thereof as well as through the section 11 is a tubular stem 15 provided at its outer end with an enlarged internally threaded pipe nipple 16 forming an external annular shoulder 17 adjacent the outer end of the stem, and seated in said nipple is an appropriate gasket 18. Surrounding the stem-receiving opening in the section 11 is an annular channel 19 in which is seated an appropriate gasket 20, and screwed upon the inner end of the stem to form an abutment for said gasket is a nut 21 connecting the sections 10 and 11 of the ball with the stem, the nut being adjusted upon the stem until the thread of the nut leaves the inner end of the thread of the stem and plows into the metal of the stem for locking the nut against retrograde movement. Thus, as will be seen, said sections may shift independently of each other upon the stem while the stem may also shift axially relative to said sections, and fixed in the wall of said stem, adjacent the shoulder 17, is a key 22 which is slidably received in a slot in the nipple 12 for locking the stem against rotation independently of the section 10.

The section 11 of the ball is provided with a flat face to confront the flat face of the wall 13 of the section 10 in parallel relation, and surrounding the flat face of the section 11 at the periphery thereof is a beveled face 23 inclining away from the beveled face 14 of the section 10. Interposed between said sections is a packing gasket 24 snugly surrounding the stem 15. The gasket is provided with flat faces to seat flat against the confronting flat faces of the sections while, at its periphery, the gasket is formed with a thickened encircling substantially wedge-shaped bead 25 having oppositely beveled side faces 26 seating flat against the beveled faces 14 and 23 of the ball sections, while the periphery of the bead is shaped to conform to the spherical contour of said sections. The gasket is preferably formed of cork, although other suitable material may be employed, and said gasket is also preferably coated with graphite. Screwed on the nipple 12 to coact with the shoulder 17 of the stem 15 is a feed nut 27 for compressing the gasket between the sections 10 and 11 of the ball, as shall later be explained.

Coacting with the ball is a socket therefor. This socket includes a socket cup 28, and screwed on the cup is a socket nut 29 having a base flange 30 seating flat against an encircling flange 31 on the cup. These flanges are provided with mating ears 32, and extending through said ears is a key 33 locking the cup and nut together. Formed on the cup in alinement with the stem 15 is an externally threaded pipe nipple 34 of an internal diameter corresponding to the internal diameter of said stem.

Initially, the gasket 24 is of an over-size major diameter so that when the socket is assembled about the ball, the gasket is compressed radially. The density of the gasket is thus increased while the gasket is thus also caused to expand radially against the wall of the socket to provide a tight joint between the ball and socket. As will be perceived, the section 11 of the ball is independently movable longitudinally of the stem 15 to provide a follower for the gasket. Similarly, the section 10 of the ball is independently movable longitudinally of the stem to also provide a follower for the gasket and, in assembling the joint, the nut 21 is initially adjusted so that the gasket is compressed somewhat between said sections. Adjustment of the nut will, as will be observed, cause the sections 10 and 11 of the ball to be shifted toward each other for clamping the gasket therebetween so that the beveled faces 14 and 23 of said sections will coact with the beveled faces 26 of the bead 25 of the gasket for compressing the bead therebetween and feeding the bead against the wall of the socket. The bead is thus caused to seat flat throughout its peripheral area against the wall of the socket to provide sealed connection between the ball and socket. Furthermore, in any instance where the joint is used in connection with a conduit conducting a fluid under pressure, the fluid pressure will act against the section 11 of the ball for advancing said section against the gasket and thus constantly compressing the gasket into engagement with the socket wall. However, when the gasket becomes worn, so that the gasket inefficiently contacts the wall of the socket, the nut 27 is adjusted in a counter-clockwise direction, which adjustment of said nut will cause the nut to coact with the shoulder 17 of the stem 15 for drawing the stem 15 outwardly to advance the section 11 of the ball toward the section 10, while the section 10 will be shifted inwardly and thus advanced toward the section 11. The compression of the gasket will be increased accordingly with the result that the bead 25 of the gasket will, in turn, be tightly pressed against the wall of the socket to perfect a sealed joint between the ball and socket, I thus provide a means externally of the joint whereby the gasket may be adjustably fed to the wall of the socket and wear on the gasket taken up.

Figure 2:
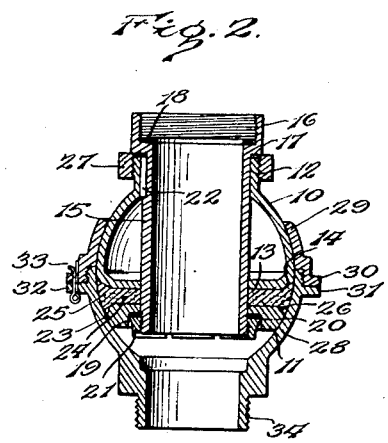
Figure 2 is a vertical sectional view taken medially through the joint.

By forming the gasket with the peripheral wedge-shaped bead 25, annular lips are provided at opposite sides of the gasket to lie in the grooves defined between the beveled faces 14 and 23 of the sections of the ball and the socket. Furthermore, the wedge-shaped bead provides a correspondingly increased peripheral gasket area to contact the wall of the socket and when the ball and socket are rocked with respect to each other, the frictional drag of the peripheral surface of said bead against the socket wall will tend to crowd said lips into said grooves and thus accentuate the sealed engagement between the gasket and the socket wall. Also, the frictional drag of the bead against the socket wall will tend to cause a local compression of the bead. The density of the bead will thus be increased accordingly so that the bead will more firmly engage the socket wall. As shown in Figure 2, the wall 13 of the ball section 10 lies in spaced relation at one side of the equatorial plane of the ball. The gasket 24 is correspondingly spaced away from said plane and in thus locating the gasket, the circumference thereof is proportionately reduced. Accordingly, the resistance offered by the gasket to the relative movement of the socket and ball, due to the frictional engagement of the gasket with the wall of the socket is, in turn, proportionately reduced, with the result that the ball and socket may be readily rocked with respect to each other and the joint easily flexed. This effect is further enhanced by the fact that in thus locating the gasket, the leverage of the ball on the gasket, when the ball is rocked, is proportionately increased.

Figure 3:
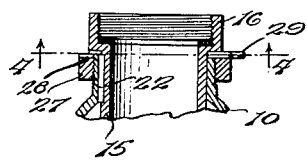
Figure 3 is a fragmentary vertical sectional view showing a slight modification of the invention.
Figure 4:
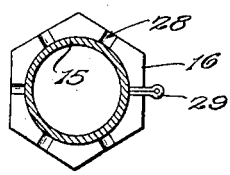
Figure 4 is a transverse sectional view on the line 4—4 of Figure 3.

In Figures 3 and 4 of the drawings, I have illustrated a slight modification of the invention, wherein the nut 27 and the shoulder 17 of the nipple 16 of the stem 15 are provided at spaced points with radial grooves 28 adapted to be brought into register to receive a key 29 which, when the nut is adjusted against said shoulder of the stem, will coact between the nut and shoulder for locking the nut in adjusted position.

In Figure 5, I have illustrated a further modification wherein the end wall 13 of the body section 10 of the ball is not only provided at its outer periphery with the beveled face 14, as in the preferred construction, but is also formed at its inner periphery with an inclined flange 30 defining a beveled face 31, and rising from the latter beveled face is a cylindrical face 32 concentric to the stem 15. Freely mounted on the stem is the cap section 33 of the ball which is retained by a nut 34, as in the preferred construction. However, as will be observed, the ball section 33 is provided with a flat inner face, and confined between said section and the body section of the ball is a gasket 35. This gasket is preferably of graphite covered cork and is provided at its outer periphery with a bead 36, while at its inner periphery, said gasket is provided at one side thereof with a flange or bead 37 fitting in the socket formed by the faces 31 and 32. The opposite side of the gasket is flat to seat the flat inner face of the ball section 33. Thus, when the follower is advanced by fluid pressure or when the nut 27 is adjusted for compressing the gasket, the flange 37 of the gasket will jam in the socket formed by the faces 31 and 32 of the wall 13 to bind between said faces and the stem 15. At its outer periphery, the gasket is provided at one side thereof with a single beveled face 38 to seat flat against the beveled face 14 of the end wall 13 and, as will be observed, the gasket is preferably located at the equatorial plane of the ball.

In Figure 6, I have illustrated another modification which is similar to the structure shown in Figure 5, with the exception that the cylindrical face 32 on the end wall 13 of the ball section 10 is omitted and the gasket 39 is provided at its inner periphery with a lip or bead 40 having a beveled face to coact with the beveled face of a flange 41 at the inner circumference of said wall.

In Figure 7, I have illustrated a further modification which is similar to the structure shown in Figure 6 with the exception that the gasket 42 is formed at its inner and outer peripheries with substantially wedge-shaped beads 43 and 44 each having oppositely beveled faces to seat flat against similar beveled faces on the sections of the ball.

In Figure 8, I have illustrated still another modification which is identical with the structure shown in Figure 6, with the exception that the retaining nut 27 on the stem 15 is omitted and the cap section 45 of the ball is screwed on the inner end of the stem. However, said cap section is, nevertheless, adapted to function as a follower for the gasket 46 since, under fluid pressure against the cap section, said stem will shift axially through the ball section 10 while the nut 27 may be adjusted for advancing the ball sections and compressing the gasket therebetween.

In Figures 9 and 10 of the drawings, I have illustrated a further modification which is identical with the preferred construction with the exception that the cap section 47 of the ball is provided at one side thereof with a peripheral annular fluid channel 48. The joint of this modified structure is particularly adapted for use in connection with a conduit conducting fluid under pressure. Should any of the fluid find its way between the cap section 47 of the ball and the gasket 49, the fluid will enter the channel 48, when the fluid pressure will serve to force the outer peripheral bead of the gasket against the socket wall to maintain a tight joint between the ball and socket.

Having thus described the invention, what I claim is:

1. In a flexible pipe joint, coacting joint members one providing a socket and the other providing a ball fitting in said socket and including opposed followers, a packing interposed between said followers, a fluid conducting stem movably supporting said followers to cooperate with the packing, means retaining the followers on the stem, means locking the stem against rotation independent of one of said followers, and a nut adjustable upon said follower to coact with the stem for advancing the followers and feeding the packing to coact between the members.

2. A flexible pipe joint comprising a socket, a ball fitting in said socket, a follower integral with the ball, a fluid conducting stem sliding axially through said follower, a second follower rotatably receiving said stem, a packing gasket between said followers and engaging said socket, an abutment on said stem bearing against the second named follower, and an adjusting nut disposed exteriorly of the ball and engaging said stem, said nut coacting with said abutment to compress said gasket between said followers.

3. A flexible pipe joint comprising a socket, a ball fitting in said socket, a follower integral with the ball, a fluid conducting stem sliding axially through said follower, a second follower rotatably receiving said stem, both of said followers having beveled edges, a packing gasket between said followers having a thickened peripheral portion fitting snugly between the beveled edges of said followers and engaging the inner wall of the socket, an abutment on said stem bearing against the second named follower, and an adjusting nut disposed exteriorly of the ball and engaging said stem, said nut coacting with said abutment to compress said gasket between said followers.

4. A flexible pipe joint comprising a socket, a ball fitting in said socket, a follower integral with the ball, a fluid conducting stem sliding axially through said follower, a second follower rotatably receiving said stem, and being provided adjacent the edge with an annular channel to receive fluid under pressure, said channel confronting the first named follower, a packing gasket between said followers and engaging said socket and adapted to be subjected to the fluid under pressure in said channel, an abutment on said stem bearing against said channeled follower, and an adjusting nut disposed exteriorly of the ball and engaging said stem, said nut coacting with said abutment to compress said gasket between said followers.

5. A flexible pipe joint comprising a socket, a ball fitting in said socket, the ball having a transverse rigid wall forming a follower, a nipple on said ball, a fluid conducting stem slidably fitted in said nipple and sliding axially through said follower, an annular shoulder on the outer end of said stem, an adjusting nut threaded on the nipple and engaging said shoulder for moving said stem longitudinally through said ball, a follower rotatably receiving said stem, a packing gasket disposed between said followers and bearing against said socket, and an abutment on the inner end of said stem bearing against the last named follower and coacting with said adjusting nut for compressing said gasket between said followers.

In testimony whereof, I affix my signature.

WALTER C. WHITE. [L. S.]